Figure 1:
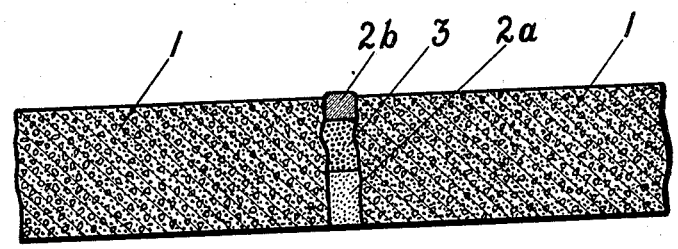

Dec. 28, 1937.     W. O. SNELLING     2,103,648
METHOD OF SEALING EXPANSION JOINTS
Filed Feb. 3, 1934

Walter O. Snelling.
INVENTOR

Patented Dec. 28, 1937

2,103,648

UNITED STATES PATENT OFFICE 2,103,648

METHOD OF SEALING EXPANSION JOINTS

Walter O. Snelling, Allentown, Pa.

Application February 3, 1934, Serial No. 709,555

11 Claims. (Cl. 94—18)

My invention relates to improvements in methods of sealing pavement and like expansion joints and more particularly relates to improved means and products for sealing open joints or cracks in pavements, sidewalks, roadways, walls and other similar structures. One of the objects of my invention is to provide highly efficient means for filling expansion joints in concrete, asphalt and composition highways at the time of their construction, and another of the objects of my invention is to provide efficient repair means for filling cracks and openings in highways, sidewalks, roadways, pavements and the like, as they appear from time to time due primarily to the effects of expansion and contraction or uneven settling of the foundation of the structure.

I have discovered that thermolyzed vulcanized products possess advantages over any material that has previously been used or suggested as a joint-filling material, and that expansion joints which are filled with suitable mixtures containing thermolyzed vulcanized products possess an ability to resist the action of atmospheric agencies, and particularly water in liquid and in frozen condition, over the entire temperature range to which pavements and roadways are subjected, from the lowest sub-zero temperatures of winter to the highest temperatures from the noon-day summer sun.

By thermolyzed vulcanized products, as used in this application, I mean vulcanized products which have been heated to a temperature of incipient decomposition and have thereby become thermolyzed or partially decomposed, so that they no longer have the chemical composition or the physical characteristics of the ordinary or non-thermolyzed vulcanized products.

The products which I prefer to employ in the practice of my invention are the products which result from heating a vulcanized material to a temperature sufficiently high to chemically modify or change such vulcanized material into highly adhesive and cohesive decomposition products. The initial materials used may be vulcanized rubber or vulcanized oils, and may represent materials vulcanized by any suitable vulcanizing process, such as vulcanization by heating with sulfur, or vulcanization by the action of sulfur chloride. In all cases, the vulcanized products are heated to a temperature sufficiently to partially or completely convert them into adhesive and cohesive decomposition products different in chemical nature and in physical characteristics from the initial vulcanized products.

The product which I have discovered to possess such remarkable properties as a sealing agent or filling agent for expansion joints and the like is the product which results from overheating or thermolyzing vulcanized rubber and more particularly vulcanized oils, to a temperature at which these vulcanized products become thermolyzed. I wish to make this distinction clear because I do not claim as my invention the use of either vulcanized rubber as such, or vulcanized animal or vegetable oils as such, as expansion joint filling materials, although I do broadly claim the new and very different thermolyzed vulcanized product herein described, and which possesses highly unique properties as joint filling agents, distinctively different from the properties of either vulcanized rubber or vulcanized factis. My work has disclosed the fact that expansion sealing joints made with my new thermolyzed vulcanized products are greatly superior in their resistance to atmospheric agencies and particularly to the action of water under the wide temperature range that is represented by out-door exposure to the elements during the entire year, to any expansion joint sealing means ever before known or used.

For the purpose of illustrating certain aspects or forms of my invention there is shown in the drawing two of the many ways in which my invention may be applied to advantage.

Figure 2:
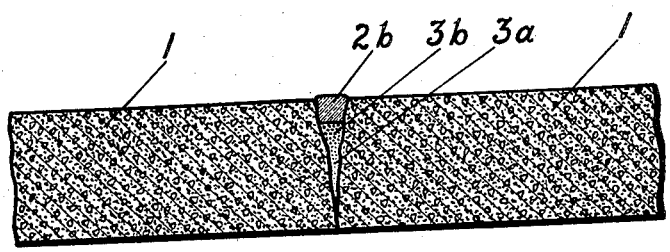

With reference to the accompanying drawing, Figure 1 is a sectional view through adjacent sections of a road surface disclosing an open joint filled in accordance with the invention, and Figure 2 is a sectional view through adjacent sections of road surface disclosing a partially open fissure joint filled in accordance with the invention.

Figure 1 is a cross section of a portion of an expansion joint in a pavement in which 1, 1 is the original pavement material, 2a, 2b, is any of the customary sealing materials, including asphalt, petroleum distillate, petroleum residue, tar, or any other like material or mixture of the type now in common use as a sealing material. In the making of such an expansion joint, the filling material 2a is first poured in, for the purpose of sealing the bottom of the opening, crack or fissure. The opening is then further filled with a layer 3 of my thermolyzed vulcanized product, which may consist of either thermolyzed vulcanized rubber or thermolyzed vulcanized oil. This product may either be poured in, in liquid condition, or may be pressed in, as the soft, very sticky solid product. The final layer of sealing material, 2b, may then be added. In the preferred form of my invention the top filling material is so-called petroleum asphalt or blown petroleum oil, and is poured in at a temperature in excess of the thermolyzing temperature of the filling product 3, so that at the high temperature of this last-applied filling agent it not only mixes with and unites with the upper layer of my thermolyzed vulcanized product, but actually assists in the further thermolyzing or decomposing of the upper surface of the thermolyzed vulcanized product, because of its temperature being higher than the thermolyzing temperature of the thermolyzed vulcanized product.

Figure 2 illustrates another form of my invention in which 1, 1 represents a cross section through the pavement and 3a and 3b represent a vulcanized product, such as rubber crumbs or ground rubber or factis crumbs or factis shreads. All of these materials are solid materials, and are introduced into the crack as solid materials which are simply packed into place. A sealing layer, preferably of blown petroleum asphalt or asphalt mixture is then poured into the crack, at a temperature in excess of the thermolyzing temperature of the filling agent, so that, as a result of its high temperature it melts and thermolyzes the vulcanized product at the top of the crack or opening to form a layer or stratum of thermolyzed vulcanized product extending entirely across the width of the fissure, crack or opening.

In still another form of my invention, factis may be formed in place in a crack or opening, insufficient factis being used to completely fill the opening. The top of the crack or fissure is then filled in an exactly similar manner to that just described, with a top sealing layer of blown petroleum asphalt or the like, poured in at a temperature in excess of the thermolyzed temperature of the factis, so as to thermolyze or pyrolyze the upper portion of the factis in the crack or fissure, so as to result in a layer of thermolyzed vulcanized factis extending entirely across the width, and entirely throughout the length of the crack or fissure, this thermolyzed vulcanized product being at the point of contact between the factis and the overlying sealing mixture.

Since thermolyzed vulcanized products of either a rubber base or an oil base mix well with asphalt, tar, fatty acid pitches and the like, it will be evident that I may employ any suitable mixture of my thermolyzed vulcanized product instead of employing the thermolyzed vulcanized product alone, and for certain purposes I find it advantageous to employ an admixture of asphalt, blown petroleum residue, coal tar, water gas tar or fatty acid pitch, or a mixture of a number of these materials with my thermolyzed vulcanized product, for use in any of the methods herein described, either as a matrix for my thermolyzed vulcanized products, or as an admixture therewith.

The partially or completely decomposed vulcanized products employed in the practice of my invention may be produced before being applied to the pavement joint, or the vulcanized products may be treated directly in place in the crack or fissure, as by the direct application of heat or flame, for example. Accordingly, I may either fill pavement joints directly with partially decomposed vulcanized materials or I may fill pavement joints with vulcanized materials and thereafter decompose or thermolyze the vulcanized materials while in place within the opening of the pavement joint or fissure.

It will of course be evident that I may apply in conjunction with my present invention any of the well known agents and particularly the well known filling agents long used in connection with expansion joint filling materials, and I may similarly avail myself, in connection with the application of my present discovery, of all of the well known methods of applying and utilizing joint filling agents. My invention resides primarily in my discovery of the extreme effectiveness of thermolyzed vulcanized products, as distinguished from the vulcanized products which have been used in the past, and my invention also involves my discovery of the particular effectiveness of thermolysis of vulcanized products in place within the crack or joint to be filled by the application to such thermolyzable vulcanized material of direct heat or flame or of heat indirectly applied through the application of an overlying layer of a joint-sealing material heated to a temperature higher than the thermolyzing temperature of a vulcanized agent present within in the crack or fissure.

In one desirable form of my invention I impregnate or saturate or coat a suitable filling agent with a vulcanized material and I then employ this product instead of the vulcanized material as herein described. As one example of this phase of my invention I may impregnate sawdust, dried peat, dried sphagnum moss, ground corn stalks, corn husks or the like with a vulcanizable oil and then I vulcanize this absorbed and coating material to obtain a soft, very compressible spongy mass of the filling agent held together by the vulcanized material as a consolidating or adhesive agent. Packing this spongy mass into a crack or fissure gives a highly resilient filling agent but one which is far too porous to water to be of commercial use. By now pouring a superheated sealing agent on top of this spongy mass, the sealing agent being heated to a temperature in excess of the thermolyzing temperature of the vulcanized consolidating agent, I obtain a sealing layer which is protected by the upper layer of petroleum asphalt or the like, and which is further protected at the upper surface of the spongy filling agent by the formation of a soft, water-resisting sticky mass of thermolyzed vulcanized product, and which is necessarily present at the exact point at which it is of maximum effectiveness in protecting the crack or fissure from penetration by water. The upper portion of the thermolyzed vulcanized product is of course very soft and tender, but it is highly efficient as a water resistant agent, and it is in turn protected from mechanical wear and abuse by the upper protecting layer of petroleum asphalt or other material which forms at one time a protecting agent, and also a means of bringing about the desired vulcanization of the vulcanizable spongy filling material.

In still another form of my invention I coat the sides and bottom of a pavement crack or expansion joint with a thin coating of an adhesive agent such as molten blown asphalt or other bituminous material, for example, and I then partially but incompletely fill the opening still left with unthermolyzed factis, or with partially but incompletely thermolyzed factis, and thereafter I apply heat to thermolyze the unthermolyzed vulcanized product, preferably by completing the filling of the opening with a bituminous composition heated to a temperature higher than the thermolyzing temperature of the vulcanized material. As a result of this treatment I obtain a central core of soft plastic thermolyzed vulcanized material completely surrounded and encased in bituminous composition, and in use such an expansion joint behaves in a way which can be illustrated by the example of the air in a pneumatic tire. It will of course be evident that air alone has no physical strength, and would be wholly incapable of sustaining the weight of a loaded automobile, but through the well known property of transmitting pressure to the surrounding container a pneumatic tire does support very heavy weights. In the case of an expansion joint or pavement crack made in accordance with that portion of my invention just described a very similar result occurs. The soft deformable thermolyzed vulcanized product is quite incapable of withstanding the load represented by an overlying automobile or truck, but when existing as a central core completely surrounded by tougher bituminous material the soft and plastically deformable thermolyzed vulcanized product transmits applied pressures to the contiguous or adjacent walls of the crack, fissure or joint, and thereby resists deformation from the applied pressure while still retaining its soft and resilient characteristics that are essential factors in its ability to completely and tightly close the opening under the changes brought about by the extreme differences of temperature between winter cold and summer heat, and also the extreme differences due to the expansion and the contraction of the pavement blocks as a result of similar temperature changes. The real function of my invention is to provide a sealing means that will resist both the changes in the dimensions of the pavement blocks and the changes in temperature which are associated with seasonal effects of the weather, while permanently affording a seal against the passage of water from the pavement surface to the underlying pavement foundation.

I do not claim as any part of my invention a paving composition or a pavement surfacing composition comprising a thermolyzed vulcanized product, as thermolyzed vulcanized products suitable for my invention are unsuitable for a pavement surface, because of their extremely soft, tacky and tender nature. By the use of very high percentages of sulfur harder and tougher vulcanized products may be obtained, but these lack the necessary qualities of tackiness that are present in the products made in accordance with my invention, and accordingly I do not claim as any part of my invention a thermolyzed vulcanized product containing more than 25% by weight of sulfur, as vulcanized products containing in excess of 25% of sulfur in combination with either rubber or with any vegetable or animal oil are unsuitable for use in the preparation of such water resisting soft plastic products as are represented by my present invention, either alone or when softened by admixture with hydrocarbons or bitumens in the amounts which it is necessary to add to impart satisfactory plasticity to these high-sulfur vulcanized products. Products made in accordance with my present invention may contain from 2% to 20% of sulfur, and in extreme cases may contain up to 25% of sulfur but vulcanized products containing more than 25% of sulfur (comparable to "hard" rubber or vulcanite) are unsuitable in the practice of my invention, even when softened by the addition of such fluxing agents as tar and soft asphalt.

I am aware that vulcanized rubber and vulcanized oils have been previously proposed for use as expansion joint filling materials and as paving materials or components of paving materials, but my invention is distinguished from such use of vulcanized rubber and vulcanized oils, in that my product is neither vulcanized rubber nor vulcanized oil, but is a new and different product which consists of the thermolyzed or partially decomposed product obtained by the overheating or pyrolyzing of such previously used vulcanized products. My thermolyzed vulcanized product is permanently soft, and is in fact so permanently soft that it is incapable of being used as a road surface or a wearing surface, and except in the case of narrow cracks or joints it is best used in conjunction with a covering or protecting surface or coating, because of its permanently soft nature. I am aware that earlier users of vulcanized oil as paving materials have heated such products, for the purpose of obtaining vulcanization, but my products are distinguished by being heated far beyond a vulcanizing temperature, and to a temperature at which the first-formed vulcanized product further breaks down to yield the soft, permanently sticky and extraordinarily plastic product of pyrolysis or thermolysis which is the thermolyzed vulcanized product described in these specifications and in the claims.

It will be evident that many changes may be made in the application of my invention within the limits of the disclosure herein made, and accordingly no limitations should be placed upon my invention except as indicated in the appended claims.

I claim:

1. The method of sealing pavement joints which comprises placing within the open space defining such joints a product obtained by heating a solid vulcanized material to a temperature sufficient to decompose a substantial portion of the solid material into highly adhesive and cohesive liquid and semisolid-decomposition products, differing in both their chemical composition and in their physical characteristics from the initial vulcanized material.

2. The method of sealing pavement joints which comprises placing within such joints a product obtained by heating the solid reaction product of sulfur chloride and a vulcanizable oil to a temperature sufficient to decompose a substantial portion of the solid material into highly adhesive and cohesive liquid and semi-solid decomposition products differing in both their chemical composition and their physical characteristics from the initial vulcanized vegetable oil.

3. The method of uniting pavement units which comprises placing within the space between adjacent pavement units a product obtained by heating a solid vulcanized material to a temperature sufficient to decompose a substantial portion of the solid material into highly adhesive and cohesive liquid and semi-solid decomposition products differing in both their chemical composition and their physical characteristics from the initial vulcanized material.

4. The method of sealing pavement joints which comprises placing within such joints a viscous liquid product obtained by heating the solid reaction product of sulfur chloride and a vulcanizable oil to a temperature sufficient to decompose a substantial portion of the solid material into highly adhesive and cohesive liquid and semi-solid decomposition products of the vulcanized oil and thereafter permitting the solidification of a substantial part of the liquid portions of such decomposition product of the heated and decomposed vulcanized oil product.

5. The method of sealing pavement joints which comprises placing within such joints a viscous liquid product obtained by heating the solid reaction product of sulfur chloride and a vegetable oil to a temperature sufficient to decompose a substantial portion of the solid material into highly adhesive and cohesive liquid and semi-solid decomposition products of the vulcanized vegetable oil and thereafter permitting the solidification of a substantial part of the liquid portions of such decomposition products of the heated and decomposed vulcanized vegetable oil product.

6. The method of sealing cracks between adjacent pavement units which comprises placing within such cracks a product comprising the product obtained by heating the solid reaction product of sulfur chloride and a vulcanizable oil to a temperature sufficient to decompose a substantial portion of the solid material into highly adhesive and cohesive liquid and semi-solid decomposition products of the initial vulcanized oil product.

7. The method of sealing pavement cracks which comprises filling the product obtained by heating a solid vulcanized material to a temperature sufficient to decompose a substantial portion of the solid material into highly adhesive and cohesive liquid and semi-solid decomposition products of the initial vulcanized material into the lower portion of the open space defining such crack and covering the previously partially decomposed vulcanized product with an overlying tough covering layer.

8. The method of sealing pavement cracks which comprises filling the product previously obtained by heating a solid vulcanized material to a temperature sufficient to decompose a substantial portion of the solid material into highly adhesive and cohesive liquid and semi-solid decomposition products of the initial vulcanized material into the open space defining such crack and covering the partially decomposed vulcanized product with an overlying tough covering layer of a bituminous material.

9. The method of sealing pavement joints which comprises filling the open space defining such joints with a product comprising a solid vulcanized material and thereafter heating the product to a temperature sufficient to decompose a substantial portion of the vulcanized material into highly adhesive and cohesive liquid and semi-solid decomposition products, differing in both their chemical composition and in their physical characteristics from the initial vulcanized material.

10. The method of sealing pavement joints which comprises partially filling the open space defining such joints with a product comprising a solid vulcanized material and thereafter contacting the filling material with a bituminous product heated to a temperature sufficient to decompose a substantial portion of the vulcanized material into highly adhesive and cohesive and liquid and semi-solid decomposition products, differing in both their chemical composition and in their physical characteristics from the initial vulcanized material.

11. The method of uniting pavement units which comprises filling the open space between open pavement units with a product comprising a solid vulcanized material and thereafter heating the product to a temperature sufficient to decompose a substantial portion of the vulcanized material into highly adhesive and cohesive liquid and semi-solid decomposition products, differing in both their chemical composition and in their physical characteristics from the initial vulcanized material.

WALTER O. SNELLING.